United States Patent [19]

Formaini

[11] Patent Number: 4,960,856
[45] Date of Patent: Oct. 2, 1990

[54] UREA-FORMALDEHYDE COMPOSITIONS AND METHOD OF MANUFACTURE

[75] Inventor: Richard Formaini, Stone Mountain, Ga.

[73] Assignee: Georgia-Pacific Corporation, Atlanta, Ga.

[21] Appl. No.: 276,750

[22] Filed: Nov. 28, 1988

[51] Int. Cl.$^5$ ............................................. C08G 12/40
[52] U.S. Cl. ................................... 528/256; 528/254; 528/259; 524/597; 524/598
[58] Field of Search ...................... 528/256, 264, 259; 524/597, 598

[56] References Cited

U.S. PATENT DOCUMENTS

| | | | |
|---|---|---|---|
| 2,652,377 | 9/1953 | Kise | 523/340 |
| 3,118,849 | 1/1964 | Wagner | 524/512 |
| 3,183,200 | 5/1965 | Hewson | 524/598 |
| 3,198,761 | 8/1965 | O'Donnell | 524/843 |
| 3,428,607 | 2/1969 | Renner | 251/9 |
| 3,553,115 | 1/1971 | Curchod | 525/164 |
| 3,712,870 | 4/1970 | Strickrodt | 556/52 |
| 3,716,483 | 2/1973 | Renner | 210/693 |
| 3,819,332 | 6/1974 | Jaccard | 422/134 |
| 3,830,783 | 8/1974 | Vargiu | 523/348 |
| 3,842,039 | 10/1974 | Vargiu | 523/348 |
| 3,849,378 | 11/1974 | Griffiths | 528/487 |
| 3,869,311 | 3/1975 | Jacquelin | 428/511 |
| 3,896,087 | 7/1975 | Brunnmueller | 524/598 |
| 3,909,348 | 9/1975 | Economou | 162/166 |
| 3,926,917 | 12/1975 | Jaccard | 528/242 |
| 3,928,122 | 12/1975 | Griffiths | 162/166 |
| 3,928,272 | 12/1975 | Brancato | 528/232 |
| 3,931,063 | 9/1976 | Renner | 521/63 |
| 3,953,421 | 4/1976 | Berstein | 524/446 |
| 3,959,570 | 5/1976 | Jacquelin | 428/478 |
| 3,962,166 | 6/1976 | Gordon | 524/843 |
| 3,981,845 | 9/1976 | Renner | 428/402 |
| 4,010,132 | 3/1977 | Renner | 524/598 |
| 4,018,741 | 4/1977 | Renner | 528/242 |
| 4,021,413 | 5/1977 | Eisele | 528/259 |
| 4,035,328 | 7/1977 | Huang | 525/53 |
| 4,051,208 | 9/1977 | Jaccard | 264/5 |
| 4,058,434 | 11/1977 | Vincent | 162/165 |
| 4,064,088 | 12/1977 | Renner | 528/148 |
| 4,101,521 | 7/1978 | Renner | 528/242 |
| 4,130,498 | 12/1978 | Lee | 252/99 |
| 4,174,310 | 11/1979 | Hubbard | 523/340 |
| 4,224,423 | 9/1980 | Ogden | 525/515 |
| 4,239,646 | 12/1980 | Vincent | 438/402.21 |
| 4,247,433 | 1/1981 | Schamberg | 524/843 |
| 4,284,759 | 8/1981 | Henbest | 528/261 |
| 4,307,005 | 12/1981 | Renner | 524/512 |
| 4,367,171 | 1/1983 | Leifels | 524/47 |
| 4,381,368 | 4/1983 | Spurlock | 524/598 |
| 4,410,685 | 10/1983 | Williams | 528/259 |
| 4,433,133 | 2/1984 | Ifuku | 528/232 |
| 4,482,699 | 11/1984 | Williams | 528/260 |
| 4,501,851 | 7/1985 | Williams | 524/542 |
| 4,536,245 | 8/1985 | Shiau | 156/307.3 |
| 4,564,667 | 1/1986 | Taylor | 528/256.1 |
| 4,603,191 | 7/1986 | Kong | 528/259 |
| 4,691,001 | 1/1987 | Taylor | 528/256 |

FOREIGN PATENT DOCUMENTS

| | | |
|---|---|---|
| 86/118476 | 1/1970 | Japan . |
| 438731 | 3/1961 | Switzerland . |
| 522007 | 4/1966 | Switzerland . |

OTHER PUBLICATIONS

66 Journal of Colloid and Interface Science (pp. 221-233) (1978).
Chemical Abstracts, vol. 104, p. 83, Abstract No. 52310m (Feb. 24, 1986).

*Primary Examiner*—Morton Foelak
*Assistant Examiner*—Sam A. Acquah
*Attorney, Agent, or Firm*—Banner, Birch, McKie & Beckett

[57] ABSTRACT

This invention relates to an aqueous solution of water soluble urea-formaldehyde precondensate having a formaldehyde-to-urea (F/U) molar ratio of between about 1.20:1.0 and 1.70:1.0 and to a method for making the precondensate solution by reacting urea and formaldehyde in the presence of acid catalyst in aqueous solution having a pH between about 3.5 and 4.25; then, in neutral to slightly basic solution.

14 Claims, No Drawings

UREA-FORMALDEHYDE COMPOSITIONS AND METHOD OF MANUFACTURE

BACKGROUND OF THE INVENTION

1. Field of the Invention

This invention relates to a urea-formaldehyde condensation product and to a method for manufacturing the product. More particularly, this invention relates to a urea-formaldehyde condensation product suitable for use as a substitute for titanium dioxide as an opacifier in the manufacture of cellulosic products, and a method of manufacturing this product.

2. Description of Related Art

Urea-formaldehyde condensation products are well known and are put to a variety of uses. In particular, urea-formaldehyde pigments are useful as modifiers of cellulosic products such as paper. Large quantities of inorganic pigments such as talc, kaolin, calcium carbonate, zinc sulfide, clay, titanium dioxide, and the like are employed as fillers in the production of paper products. Ordinarily, such inorganic pigments are effective in the preparation of paper products having suitable properties of brightness, opacity, basis weight, softness, smoothness, finish, and ink absorption.

An additive for cellulosic products such as paper must perform the functions of an inorganic filler for which it is substituted if it is to gain wide commercial acceptance. Further, to be acceptable to the paper industry, a chemical additive for paper must be one which does not migrate from the base sheet to adjacently held absorbent material. Also, the additive must not cause "blocking", i.e., sticking together of adjacent paper layers when the paper is rolled or stacked sheet upon sheet.

Urea-formaldehyde condensation products are suitable as synthetic additives because they provide the above-described desired characteristics to paper and cellulosic products. Condensate products, also called condensation products, result from the reaction of, in this instance, urea and formaldehyde to form polymeric products. Combination of these monomer molecules with the elimination of water is known as condensation.

Suitable condensation products typically contain urea and formaldehyde in a range of relative proportions and may be prepared in accordance with many known methods. Condensation products may be useful in more than one technology. For example, see U.S. Pat. No. 3,981,845, wherein a urea-formaldehyde condensation product is described as suitable both as an additive for paper and a reinforcing filler for rubber.

Typical methods of making urea-formaldehyde condensate products are disclosed in U.S. Pat. Nos. 3,981,845, 3,909,348, and 4,367,171. Other methods of making urea-formaldehyde resins are known. For example, in a preparation method disclosed in U.S. Pat. No. 4,410,685, urea and formaldehyde are first reacted in a very acidic solution (i.e., pH less than about 2.5), then the reaction is completed under basic conditions. Such product typically is utilized as an adhesive or binder for wood-containing constructions.

Typically however, known preparation methods have drawbacks that make them less than satisfactory in commercial applications. In many known methods for preparing additives for paper, such as the method described in U.S. Pat. No. 3,981,845, a mixture of urea and formaldehyde or a urea-formaldehyde precondensate is polymerized. Precondensates typically are prepared in neutral or alkaline solutions. However, such solutions are not stable for extended periods, and must therefore be used promptly. Thus, known methods using such precondensates are unsatisfactory because failure to use precondensate essentially immediately results in a waste of solution and precludes preparation of precondensate days in advance of its intended use or in a location other than the immediate vicinity of its intended use. Further, use of urea and formaldehyde separately require separate storage and handling facilities and sources of supply, and entails other inconvenient aspects.

SUMMARY OF THE INVENTION

It is an object of this invention to provide a urea-formaldehyde condensation product and a method for preparing the product.

It is another object of this invention to provide a urea-formaldehyde condensation product suitable for use as a substitute for titanium dioxide as an opacifier in the manufacture of cellulosic products.

It is a further object of this invention to provide a method for manufacturing a urea-formaldehyde condensation product wherein a precondensate is prepared by acidic catalysis.

It is yet another object of this invention to provide an aqueous solution of watersoluble urea-formaldehyde precondensate and a method for preparing the solution.

In accordance with these and other objects, this invention relates to an aqueous solution of water soluble urea-formaldehyde precondensate having a formaldehyde-to-urea (F/U) molar ratio of between about 1.20:1.0 and 1.70:1.0 and to a method for making the precondensate solution by reacting urea and formaldehyde in the presence of acid catalyst in aqueous solution having a pH between about 3.5 and 4.25; then, in neutral to slightly basic solution.

This invention also relates to a urea-formaldehyde condensation product having an F/U ratio of between about 1.25:1.0 and 1.70:1.0 and having substantially spherical, amorphous particles having a particle size up to about 1.5 microns and which form agglomerates. The product is supplied in aqueous slurry form or as dried agglomerates having a mean average agglomerate size up to about 20 microns.

The invention further relates to a method of making this urea formaldehyde condensation product by charging the precondensate solution into an agitated, acidified liquid and continuing reaction to convert the water-soluble urea-formaldehyde precondensate to insoluble methylene-urea compounds, i.e., urea-formaldehyde condensate product described above.

DETAILED DESCRIPTION OF THE INVENTION

This invention is based on the discovery that aqueous solutions of water-soluble urea-formaldehyde precondensate prepared under acidic conditions and by use of acid catalysis are especially suitable intermediates in the production of urea-formaldehyde condensate products. The precondensate solutions have an F/U ratio which, upon further reaction in acidified liquid, forms urea-formaldehyde condensate having an F/U ratio of between about 1.25:1.0 and 1.70:1.0. It has been discovered that urea-formaldehyde precondensate prepared by acidic catalysis has a higher proportion of desirable methylene moieties and a lesser proportion of undesirable methylol moieties. Further, these precondensate solutions are sufficiently stable that they need not be used immediately, and thus provide additional flexibility in the urea-formaldehyde condensate manufacturing process. In addition, product yield and control over the means agglomerate size of the urea-formaldehyde condensate product are improved.

In accordance with the method of this invention, urea and formaldehyde in the desired proportion are reacted under acidic conditions with acid catalysis. Then the solution pH is adjusted to neutral or slightly basic condition and reaction is continued to form a precondensate solution in which the urea-formaldehyde precondensate is soluble. Further in accordance with the invention, this solution is introduced into acidified liquid and further reacted to convert the water-soluble urea-formaldehyde precondensate to insoluble methylene-urea compounds, i.e., urea-formaldehyde condensate product. Insoluble urea-formaldehyde product is recovered in the form of slurry or dried agglomerates.

Urea-formaldehyde condensate product of this invention has an F/U ratio between about 1.25:1.0 and 1.70:1.0, preferably between about 1.30:1.0 and 1.45:1.0, and more preferably between about 1.35:1.0 and 1.40:1.0. Thus, when the acidified liquid into which the precondensate solution is charged and further reacted is essentially formaldehyde-free, the precondensate should have essentially the same F/U ratio as is desired in the urea-formaldehyde condensate product. However, when formaldehyde-rich liquor is recycled from a subsequent decantation or condensate filtration step to the urea-formaldehyde condensate product-forming reactor, or a "synthetic recycle" is prepared and utilized, as described below, lower F/U ratios can be utilized to form the precondensate because formaldehyde present in the recycle provides additional formaldehyde with which the urea-formaldehyde precondensate reacts in the product-forming reactor. For example, the F/U ratio of the precondensate may be reduced to about 1.20:1.0, depending upon the quantity of formaldehyde in the liquor.

Urea and formaldehyde may be supplied in any convenient form from which a solution having the desired F/U concentration can be prepared. Typically, formaldehyde is available in aqueous solution of various strengths, sometimes in combination with urea. Such solutions conveniently are used in the method of this invention. Solutions containing about 50 weight percent formaldehyde or aqueous solutions containing both urea and formaldehyde, such as a commercially-available solution containing about 25 weight percent urea, about 60 weight percent formaldehyde, and about 15 weight percent water, are preferred. Such solution is available under the trademark STA-FORM 60 ®. Similarly, urea is available as, for example, 45 weight percent aqueous solution.

Skilled practitioners recognize that both urea and formaldehyde are very soluble in water, so solution having essentially any concentration of urea and formaldehyde in the described ratio may be prepared. However, skilled practitioners also recognize that water should be present in a concentration of between about 5 and 60 weight percent, preferably between about 10 and 45 weight percent, so that the resulting urea-formaldehyde precondensate solution is not so dilute that it requires large storage volumes, nor so concentrated that it is viscous or for other reasons not conveniently transported in commerce.

Skilled practitioners also recognize that concentrated formaldehyde solutions may contain a large quantity of formic acid. Thus, even after urea, which forms mildly basic aqueous solutions, is added in accordance with the method of the invention, the pH remains very low, i.e., less than about 3. Thus, it may be necessary to treat the formaldehyde solution before it is used, for example, by treating it with ion exchange resin, to remove the acid. In the alternative, the pH may be adjusted to neutral to basic conditions by adding basic material such as NaOH (caustic) to the formaldehyde, adding urea and beginning reaction, then adjusting the pH to the acid conditions described below for further reaction.

The reaction of urea and formaldehyde to form precondensate is catalyzed by acid. Any acid which provides a pH between about 3.5 and 4.25, preferably between about 3.75 and 4.0, when present in catalytically active quantity at the beginning of reaction, may be used in the method of this invention. Any strong acid, such as mineral acids and organic acids such as the stronger carboxylic acids, are suitable. Thus, suitable acids include formic acid, acetic acid, chloracetic acids, acrylic acid, oxalic acid, malonic acid, maleic acid, tartaric acid, citric acid, sulfurous acid, nitric acid, phosphoric acid, sulfuric acid and hydrochloric acid. Formic acid is preferred because it is a sufficiently strong acid and is relatively non-corrosive.

A quantity of protective colloid or dispersant preferably is added to prevent localized agglomeration or coagulation of the urea-formaldehyde condensate product as reaction proceeds. Although the likeihood of coagulation is greater during a subsequent reaction phase under highly acid conditions, colloid conveniently is added to the precondensate reactor. Examples of suitable protective colloids include sodium salt of carboxymethylcellulose, methylcellulose, ethylcellulose and beta-hydroxyethylcellulose, polyvinyl alcohol, and water-soluble polymers and copolymers of acrylic or methacrylic acid. Polyvinyl alcohol is a preferred protective colloid. Widely available aqueous solutions containing between about 1 and 10 wt percent polyvinyl alcohol conveniently are utilized; 1 percent solution is preferred. The quantity of protective colloid required is known to skilled practitioners.

The solution containing the urea and formaldehyde reactants and the acid catalyst then is heated to a temperature between about 65° and 90° C., preferably between about 75° and 85° C. The rate of heating depends, inter alia, upon the equipment utilized and is not important to a method of the invention so long as care is taken to ensure that no local overheating occurs. Temperatures greater than about 90° C. cause reaction to proceed too rapidly to afford adequate control over the reaction, resulting in production of insoluble polymerizates and formation of gel, while temperatures less than about 65° C. are inefficient because the reaction rate is slow.

Typically, reaction is allowed to proceed at the above-described temperature for a period sufficient to create low molecular weight precondensate. Of course, the length of this period depends upon the reaction temperature, with higher temperatures requiring shorter periods. At a temperature between about 75° and 85° C., typically a period between about 20 and 40 minutes, more typically about 30 minutes, is sufficient to satisfy this criterion. As little as 10 minutes (at 90° C.) may be sufficient, and as much as 90 minutes (at 65° C.) may be required.

After the high temperature reaction period, the pH of the solution is adjusted to between about 7.0 and 8.0, preferably between about 7.2 and 7.8, by addition of a basic material such as sodium hydroxide solution, and the temperature of the solution is lowered to between about 40° and 70° C., preferably between about 55° and 65° C. Again, reaction at higher temperature may be difficult to control and may yield a gel. Reaction is continued under these conditions for between about 30 and 60 minutes, preferably between about 40 and 45 minutes. The resulting urea-formaldehyde precondensate remains completely soluble in the aqueous solution.

It is not necessary to charge all the urea at the beginning of the reaction. Indeed, it is preferable to maintain a slightly higher F/U ratio, e.g., between about 2.7:1.0 and 3.5:1.0, when the pH is low. The higher F/U ratio helps maintain the solubility of the precondensate being formed by reducing methylol condensation typically prevalent at acid conditions, thus keeping the molecular weight of the precondensate very low at this stage of the reaction. Therefore, it is preferred that, at start of reaction, the F/U ratio preferably is between about 2.7:1.0 and 3.5:1.0. The remainder of the urea charge conveniently is added at the beginning of the lower temperature reaction period.

The precondensate solution thus prepared is sufficiently stable that it need not be utilized immediately. Rather, it remains suitable for use for as much as 10 days after it is prepared. If the precondensate solution is not to be used immediately, it should be cooled to ambient temperature, i.e., between about 15° and 25° C., for storage. No other precautions need be taken.

Thus produced soluble urea-formaldehyde precondensate is further reacted to form urea-formaldehyde condensation product by introducing the precondensate solution into acidified liquid, as described below. The liquid into which the precondensate is introduced is acidified to a pH between about 1.0 and 2.0, preferably about 1.2, with a mineral acid. Suitable acids include sulfuric acid, hydrochloric acid, and nitric acid. Sulfuric acid (in concentrated solution, i.e., about 96 weight percent $H_2SO_4$) is a preferred acid. Those skilled in the art recognize that acid-resistant material of construction will be required for the vessel.

The precondensate solution is added as quickly as possible to agitated, acidified liquid in the reactor at a temperature between about 38°–46° C., preferably about 40° C. Both agitation and the quick combination of the liquids, i.e., the precondensate solution and the liquid in the reactor, ensure that the urea-formaldehyde condensate particles do not become excessively large and minimize formation of localized hot spots. As those skilled in the art recognize, the degree of agitation required during mixing and subsequent reaction depends upon the concentration of the reactants and of the subsequently-formed slurry. Protective colloid can be added at this time if it was not added during precondensate formation.

After the liquids are thoroughly mixed, the temperature is increased, typically at a rate of about 1° C. per minute, until the temperature is within about 10° C. of the subsequent reaction temperature, at which time the temperature can be raised at a rate of about 3° C. per minute. Heating is stopped when the temperature is between about 55° and 80° C., preferably between about 55° and 70° C., and the precondensate is further reacted at this temperature for a period sufficient to convert the water-soluble precondensate to insoluble methylene-containing urea-formaldehyde condensate product. Skilled practitioners recognize that the degree of completeness of reaction is an economic choice, and that reaction may be stopped after as little as ½ hour. At the preferred temperatures, the period required to complete the reaction is between about 1 and 7 hours, with shorter periods required at higher temperatures.

The relative quantity of precondensate solution and acidified liquid is established so that, upon manufacture of the urea-formaldehyde condensate product, the resulting slurry is sufficiently stable and has a solids concentration which conveniently can be further treated. That is, the solids concentration should not be so high that a significant quantity of urea-formaldehyde condensate product precipitates out of the slurry, or that the slurry cannot be handled, for example, is difficult to transport between vessels for further treatment. Similarly, the slurry should not so dilute that large quantities of liquid must be treated or removed during subsequent processing steps. Typically, the solids concentration, i.e., the percent of nonvolatile material within the slurry, is between about 5 and 20 wt. percent, more typically between about 10 and 15 wt. percent.

As described above, when the acidified liquid is water, the F/U ratio of the precondensate preferably is essentially the same as the F/U ratio desired in the condensate product. However, when formaldehyde-rich liquor recycled from the decantation step or the filtration step described below is utilized, the F/U ratio of the precondensate is lower than the F/U ratio desired in the condensate product, because formaldehyde from the recycled liquid will be incorporated into the polymerized network when the precondensate is further reacted in the acidified liquid.

The insolubility of the urea formaldehyde condensate product causes it to form a slurry as the reaction proceeds. This slurry is cooled to ambient temperature, then preferably is treated with a base to raise the pH to between about 7.5 and 8.5, more preferably to between about 7.8 and 8.2. Preferred basic compositions include sodium hydroxide and calcium hydroxide; potassium hydroxide also may be utilized. However, use of ammonium solution at this point precludes recycle of formaldehyde-rich liquor from either the decantation step or the dewatering step described below. Neutralized slurry then is wet-milled to comminute large particles which may have formed and to ensure that all particles are reduced in size to less than about 10 microns.

Further treatment of the wet-milled slurry depends upon the form in which the urea formaldehyde condensate product will be provided. Product in slurry form is prepared by decanting excess liquid, if necessary, to increase the solids content to at least about 12 wt. percent, preferably about 15 wt. percent. Then, a formaldehyde scavenger such as urea, sodium sulfite, or ammonia is introduced into the slurry to scavenge unreacted formaldehyde in a process well known to those skilled in the art. The decanted liquid contains formaldehyde and can be recycled to provide at least a portion of the acidified liquid in which precondensate is further reacted, as described above.

If the urea formaldehyde condensate product is to be supplied as dried agglomerates, the slurry is dewatered in any suitable fashion to increase the solids concentration to at least about 20 wt. percent, preferably at least about 24 wt. percent. Any type of dewatering process, such as vacuum filtration or centrifugation, may be utilized. The separated liquid contains formaldehyde and can be recycled to provide at least a fraction of the acidified liquid to which precondensate solution is added, as described above.

Dewatered filtered cake then is dried in any heated gas inert to urea formaldehyde condensate polymer. Preferably, air heated to a temperature of between about 150° and 300° C., preferably between about 200° and 250° C., is utilized. The solids content of the dried cake typically is at least about 25 wt. percent, preferably between about 35 and 50 wt. percent. Typically, the quantity of water allowed to remain in the cake is a matter of design choice. Dried agglomerate then is fed into an appropriate mixer wherein ammonia can be reacted with the solid product to scavenge unreacted formaldehyde. A ribbon mixer is suitably utilized to combine the ammonia with the dried slurry. Thus-treated solid is bagged or put in other containers for shipment or storage.

The urea formaldehyde condensate product produced in accordance with the method of this invention will have particle size typically between about 0.5 and 1.2 microns, and dried agglomerates will have a mean agglomerate size of up to about 20 microns, preferably up to about 10 microns. Because the urea formaldehyde precondensate was prepared in acidic solution and was quickly mixed with and further reacted in agitated, very acidic solution, the resulting urea formaldehyde product particles are substantially spherical, amorphous, and nonporous, and have a dimpled surface.

The product exhibits an oil absorbency typically at least equal to 100 grams of oil per 100 grams of product, preferably between about 135 and 260 grams of oil per 100 grams of product, as determined by the procedure described in ASTM Method D281-31. BET specific surface area, determined in a manner recognized by those skilled in the art, typically is in the range of 0.5–25 $m^2/g$, preferably between about 0.5 and 20 $m^2/g$. This product is particularly suited for use as a paper additive when substituted for titanium dioxide as an opacifier when the BET specific surface area range is preferably about 5–20 $m^2/g$.

An aqueous solution intended to represent a "synthetic recycle" also may be utilized to provide at least a portion of the acidified liquid in which the urea formaldehyde precondensate is further reacted. This "synthetic recycle" can, for example, be made up of an aqueous solution of sodium sulfate, formaldehyde, methylolurea compounds, and other components typically found in recycled liquid, i.e., liquid recovered from the above-described decantation or filtration.

The following examples are presented to further illustrate the invention, and are not to be considered limiting in any way. The invention is limited only by the scope of the appended claims.

EXAMPLES

Throughout the Examples, all parts are on a weight basis unless otherwise noted.

EXAMPLE 1

A. Preparation of Urea Formaldehyde Precondensate

Water (351 parts), STA-FORM60 ® (1917 parts), and 287 parts solid urea were combined in an agitated reactor and heated to 27° C. to aid dissolution of the urea. The pH was lowered to between about 3.9 and 4.0 by addition of 11.8 parts 23 wt. percent formic acid aqueous solution. The temperature of the acidified solution was increased to 80° C. during a one-half hour period, and was allowed react at this temperature for 30 minutes.

After 30 minutes reaction time, 4.5 parts 50 wt. percent aqueous caustic (NaOH) solution were added, increasing the pH to 7.6. Then, 984 parts urea and 1448 part water were added and the temperature was adjusted to 60° C. The mixture was allowed to react for 30 minutes, then was cooled to about 25° C. storage. This precondensate solution remained stable for 2 days.

EXAMPLE 2

A. Preparation of Urea Formaldehyde Precondensate

An aqueous solution comprising 25 wt. percent urea, 60 wt. percent formaldehyde, and 15 wt. percent water was charged (41.3 parts) to a vessel and 0.23 parts of 23 wt. percent formic acid was added. The pH of the solution was between 3.8 and 4.0. A quantity (13.72 parts) of 45 wt. percent urea in aqueous solution was added to the vessel to produce an F/U ratio of about 3:1, and the mixture was heated to 80° C. to react urea and the formaldehyde.

After 30 minutes of reaction, 0.06 parts of 50 wt. percent sodium hydroxide aqueous solution was added to raise the pH to between about 7.2 and 7.8, after which 44.69 parts of 45 wt. percent urea solution was added. The temperature was adjusted to 60° C. and reaction continued for 40 minutes, after which the precondensate was cooled to ambient conditions, i.e., about 25° C.

This precondensate solution has an F/U ratio of about 1.35 and was usable 5 days after it was prepared.

B. Preparation of Urea Formaldehyde Condensate Product

An aqueous solution comprising 30.37 parts of water, 0.54 parts of 96 percent sulfuric acid, and 45.45 parts of a 1 percent aqueous solution of polyvinyl alcohol (Vinol 205 ®) was prepared and the temperature adjusted to 40° C. Then, 22.73 parts of the precondensate solution prepared in part A of this example was added as quickly as possible and with vigorous agitation.

After 10 minutes of agitation, the temperature was raised to 50° C. at a rate of 1° C. per minute then to 60° C. at a rate of 3° C. per minute. After 4 hours of reaction time, the polymer slurry was cooled to 25° C., and the pH was adjusted to between about 7.8 and 8.2 by adding 0.81 parts of 50 percent caustic (NaOH) aqueous solution. The oil absorbance of the product was 230 grams per 100 grams of condensate.

EXAMPLE 3

A. Preparation of Urea Formaldehyde Precondensate

The pH of 574 parts of 50 wt. percent formaldehyde aqueous solution (pH=3.0) was adjusted to between about 8.2 and 8.4 by adding a small quantity of (0.82 parts) 50 percent aqueous caustic (NaOH) solution. Urea (191 parts) was added and the temperature of the solution was raised to 80° C. After 30 minutes of reaction, the pH was lowered to between about 3.8 and 4.1 by adding 10 percent sulfuric acid ($H_2SO_4$) solution.

Reaction was continued for 60 minutes at 80° C. Then, 998 parts of hot tap water was added together with a quantity of caustic solution sufficient to adjust the pH to between about 7.2 and 7.6. Then, 234 parts of urea were added and reacted for 60 minutes after the temperature was adjusted to 60° C. The resulting product slurry was stable for 10 days at 25° C.

B. Preparation of Urea Formaldehyde Condensate Product

Two days after the precondensate of step A was prepared, 275 parts of the precondensate, 3 parts Vinol 205 ®, and 450 parts water were introduced into a stirred reactor. The temperature of this solution was increased to 50° C., at which time 36 parts of a sulfuric acid solution (30 parts water and 6 parts 96 percent $H_2SO_4$ solution) were added over a 1 to 2 minute period, during which the solution was moderately-vigorously agitated. Reaction was allowed proceed at a temperature between about 50° and 60° C. for a period of about 2 hours. The resulting slurry was neutralized with about 7.9 parts 50 wt. percent aqueous caustic solution to pH of about 6.4 and the temperature reduced to 25° C.

Three samples of the resulting product were tested for oil absorption in accordance with ASTM Method D281-31 and were found to have an average oil absorbance of about 2.3 grams of oil per gram product.

EXAMPLE 4

A. Preparation of Urea Formaldehyde Precondensate

STA-FORM 60 ® solution (1917 parts) was acidified to pH equal to about 3.9 with 14 parts of 23 wt. percent formic acid aqueous solution. Then, a urea solution prepared by dissolving 287 parts of urea in 351 parts water was added, and the temperature of the mixture was increased to 80° C.

After 30 minutes of reaction at 80° C., 4.4 parts of 50 percent aqueous caustic solution was added to yield to yield a pH of about 7.5. Then, 984 parts of urea and 1448 parts of water were added and the temperature was adjusted to 60° C. The temperature was further reduced to 25° C. after 30 minutes reaction time.

B. Preparation of Urea Formaldehyde Condensate Product

An acid solution containing 12 parts 96 wt. percent sulfuric acid aqueous solution and 1623 parts water was added to 345 parts of the precondensate of step A in a stirred reactor. The mixture was heated to 60° C. and allowed to react for 1 hour. The temperature of the product was lowered to 25° C., at which time about 19 parts 50 wt. percent aqueous caustic solution was added to adjust the pH to 7.9.

The slurry was filtered through a Buchner funnel using a Whatman No. 2 paper (15 cm) at 13 inches Hg vacuum to yield 298.2 parts of filter cake containing 29.6 wt. percent non-volatile solids. The solid product had an oil absorbance of 1.27 grams of oil per grams of solid.

EXAMPLE 5

Urea formaldehyde precondensate and urea formaldehyde condensation products made therefrom were made in a plurality of batches, the products of which were blended and applied to paper products. As described below, the product of the invention prepared in accordance with the method of the invention, served as a suitable substitute for titanium dioxide as an opacifier.

A. Preparation of Urea Formaldehyde Precondensate

A mixture of 423 parts water and 0.2 parts AF-75 is added to a reactor and stirred. Then, 12.3 parts Vinol 205 ® are added slowly and the mixture is heated to 60° C. to dissolve all components. The temperature is reduced to 40° C., then 334 parts of STA-FORM 60 ® are added. The pH is reduced to between about 4.0 and 4.3 by adding about 2 parts 90 percent formic acid aqueous solution.

After addition of 50 parts of urea, the mixture is heated rapidly to 80° C. This temperature is held for about 15 minutes, then quickly lowered to 60° C. Addition of 2 parts of 50 percent aqueous caustic solution raised the pH to between about 7.5 and 9.0. Then, 170 parts of urea are added, and, after about 20 minutes of reaction time, the temperature is lowered to ambient temperature, i.e., between about 25° and 32° C.

B. Preparation of Urea Formaldehyde Condensate Product

Six hundred forty-five parts of water are charged to a stirred reactor. Four parts 96 percent aqueous sulfuric acid solution are added to the agitated liquid, together with 22 parts sodium sulfate. The mixture is heated to 40° C., and 244 parts of previously prepared precondensate are added within a period of about 1 minute.

The temperature of the mixture is raised to 65° C. at 1° C./minute. The mixture is allowed to react at a temperature between about 65° and 68° C. for 1.5 hours. Thereafter, the temperature is reduced to 45° C. by using a combination of cooling water and pressure reduction to cool the mixture by evaporating water. Then, the vacuum is released, and 6 parts 50 percent sodium hydroxide aqueous solution are added, increasing the pH to between about 7.5 and 9.0. Simultaneously, the temperature is reduced to 35° C. Then, agitation of the resulting product was stopped.

C. Recovery of Formaldehyde rich Solution for Recycle and Preparation of Product Slurry Urea formaldehyde condensate product slurry prepared as described in step B in the amount of 921 parts is allowed to settle, unagitated, for about 1 hour. Although urea-formaldehyde particles are present throughout the settled slurry, two layers form: formaldehyde-rich recycle fluid with fewer urea-formaldehyde particles over particle-rich product slurry on the bottom. Then, at least about 150 parts of recycle containing few urea-formaldehyde condensate product particles is withdrawn through vacuum lances symmetrically placed around the reactor. An equal quantity of water subsequently is added through the lance in a similar manner.

A second portion of formaldehyde-rich liquid, up to about 150 parts, is siphoned off. Then, a quantity of water typically up to about 100 parts, may be added to the re-suspend slurry so that the agitation can be easily and safely accomplished within the limits of, inter alia, the power of the agitator and the solids concentration in the slurry.

Thereafter, about 0.3 parts of Kelzan-S (a suspending agent derived from seaweed) and 10 parts urea (formaldehyde scavenger) is added and the vessel is agitated for about 30 minutes.

D. Preparation of Paper Containing Product of the Invention and Comparison to Known Opacifier Products Pigment prepared as described in this Example was substituted for a major portion of titanium dioxide in a pigment and compared with 100 percent titanium dioxide. Although operating difficulty with the paper processing machine caused increased moisture concentration in the paper and decreased pigment retention as the test proceeded, this example illustrates the suitability of the opacifier product of the invention.

The following tests were run seriatim:

| Test | Opacifier | Quantity | Retention |
|------|-----------|----------|-----------|
| A | Titanium dioxide | 101 lb/T | 71.3 |
| B | 40 percent titanium dioxide/60 percent pigment of this invention | 132 lb/T | 68 |
| C | 40 percent titanium dioxide/60 percent pigment of this invention | 100 lb/T | — |

In each test run, the remainder of the filler components remained unchanged.

The Table below summarizes the key results from testing of the paper made in the 3 above-described tests.

TABLE 1

| Test | Basis Wt., g/m² | Caliber (Thousandths) | Gurley Porosity | Opacity | Brightness |
|------|------|------|------|------|------|
| A | 76.15 | 4.56 | 17.0 | 92.6 | 83.7 |
| B | 74.22 | 4.94 | 9.9 | 91.0 | 84.8 |
| C | 73.48 | 4.89 | 7.7 | 91.0 | 86.5 |

Although preferred embodiments of this invention have been described herein, skilled practitioners recognize that changes and modifications may be made without departing from the spirit of the invention, as defined in and limited only by the scope of the appended claims.

I claim:

1. A method for manufacturing an aqueous solution of water-soluble urea-formaldehyde precondensate comprising:
   (a) reacting urea and formaldehyde at a temperature between about 65° and 90° C. in the presence of acid catalyst in aqueous solution having a pH between about 3.5 and 4.25;
   (b) increasing the pH of the solution to between about 7.0 and 8.0 and adjusting the temperature to between about 40° and 70° C.; and
   (c) maintaining the conditions of step (b) and continuing to react urea and formaldehyde for a time sufficient to produce said aqueous precondensate solution.

2. The method of claim 1 wherein the molar ratio of formaldehyde to urea of the precondensate is between about 1.20:1.0 and 1.70:1.0.

3. The method of claim 2 wherein the molar ratio of formaldehyde to urea of the precondensate is between about 1.20:1.0 and 1.45:1.0.

4. The method of claim 2 wherein the molar ratio of formaldehyde to urea in step (a) is between about 2.7:1.0 and 3.5:1.0 and further comprising adding urea during step (b) to obtain the desired molar ratio of formaldehyde to urea in the precondensate.

5. The method of claim 1 wherein the reaction of step (a) has a duration of between about 10 and 90 minutes and the reaction of step (c) has a duration of between about 30 and 60 minutes.

6. The product produced in accordance with the method of claim 1.

7. A method for manufacturing insoluble urea-formaldehyde particles comprising:
   (a) forming an aqueous solution of water-soluble urea-formaldehyde precondensate, said aqueous precondensate solution made by (i) reacting urea and formaldehyde at a temperature between about 65° and 90° C. in the presence of acid catalyst in aqueous solution having a pH between about 3.5 and 4.25; (ii) increasing the pH of the solution to between about 7.0 and 8.0 and adjusting the temperature to between about 40° and 70° C.; and (iii) maintaining the conditions of step (ii) and continuing to react urea and formaldehyde for a time sufficient to produce said aqueous precondensate solution;
   (b) quickly introducing said aqueous precondensate solution into agitated acidified liquid having a pH less than about 2.0 and a temperature between about 38° and 46° C. and mixing said aqueous precondensate and said acidified liquid to form an intimate mixture;
   (c) increasing the temperature of said intimate mixture to between about 55° and 80° C.;
   (d) reacting said intimate mixture at a temperature between about 55° and 80° for a time sufficient to convert the water-soluble urea-formaldehyde precondensate to insoluble urea-formaldehyde particles.

8. The method of claim 7 wherein the molar ratio of formaldehyde to urea of the precondensate is between about 1.20:1.0 and 1.70:1.0.

9. The method of claim 8 wherein the molar ratio of formaldehyde to urea of the precondensate is between about 1.20:1.0 and 1.45:1.0.

10. The method of claim 8 wherein the molar ratio of formaldehyde to urea in step (a(i)) is between about 2.7:1.0 and 3.5:1.0 and further comprising adding urea during step (a(ii)) to obtain the desired molar ratio of formaldehyde to urea in the precondensate.

11. The method of claim 9 wherein the molar ratio of formaldehyde to urea of the particles is between about 1.25:1.0 and 1.70:1.0.

12. The method of claim 7 wherein the particles have a diameter less than about 1.5 microns.

13. The method of claim 7 wherein the reaction of step (a(i)) has a duration of between about 10 and 90 minutes, the reaction of step (a(iii)) has a duration of between about 30 and 60 minutes, and the reaction of step (d) has a duration of between about one-half and 7 hours.

14. The product produced in accordance with the method of claim 7.

* * * * *